United States Patent [19]

Ebbers et al.

[11] Patent Number: 5,255,359
[45] Date of Patent: Oct. 19, 1993

[54] PICKING FUNCTION FOR A PIPELINE GRAPHICS SYSTEM USING HIERARCHICAL GRAPHICS STRUCTURES

[75] Inventors: Timothy J. Ebbers, Shokan; Daniel G. Gibbons, Ulster Park; David W. Li, Kingston; Bob C. Liang, West Hurley; David C. Tannenbaum, Kingston, all of N.Y.

[73] Assignee: International Business Machines Corporation, Armonk, N.Y.

[21] Appl. No.: 425,781

[22] Filed: Oct. 23, 1989

[51] Int. Cl.$^5$ .............................................. G06F 3/153
[52] U.S. Cl. ................................... 395/161; 395/155; 345/139
[58] Field of Search ... 364/521, 518, 522, 200 MS File, 364/900 MS File; 340/747, 750, 703, 729; 395/155, 161

[56] References Cited

U.S. PATENT DOCUMENTS

| | | | |
|---|---|---|---|
| 4,847,785 | 7/1989 | Stephens | 364/518 |
| 4,847,786 | 7/1989 | Wang et al. | 364/518 |
| 4,870,599 | 9/1989 | Hempel et al. | 364/518 |
| 4,970,664 | 11/1990 | Kaiser et al. | 364/521 |
| 4,974,175 | 11/1990 | Suzuki et al. | 364/522 |

FOREIGN PATENT DOCUMENTS

| | | |
|---|---|---|
| 0030160 | 6/1981 | European Pat. Off. . |
| 0200172 | 12/1986 | European Pat. Off. . |
| 80/02755 | 12/1980 | PCT Int'l Appl. . |

OTHER PUBLICATIONS

Abi-Ezzi et al., "A Special Graphics System for PHIGS", *Computers and Graphics*, 1988, pp. 155-162.

*Primary Examiner*—Phu K. Nguyen
*Attorney, Agent, or Firm*—Mark S. Walker; William A. Kinnaman, Jr.

[57] ABSTRACT

A graphics display system picking function tracks machine states of pickable primitive operators through the use of a pick stack and machine state memory. The pick stack operates as a stack when accessed by pipeline processors. Pipeline processors can add an element to the stack or remove elements from the stack as structures are processed. Selection or picking of an object causes a graphics control processor to randomly access the pick stack to determine the attributes of a picked primitive. The machine state memory is implemented as a video RAM allowing rapid copying of rows containing machine states for various structure levels in the hierarchy. A first area of the machine state memory stores the states relating to the structures in the hierarchy as they are executed. A second area retains an abbreviated state description for each pickable primitive while a final area contains abbreviated machine state information for picked objects to be echoed by the system. The pick stack and machine state memories operate together to provide rapid pick identification, picked primitive machine state identification, and picked primitive echoing. The use of separate picked primitive echo machine storage allows drawing of the picked primitives without a complete re-traversal of the displayed list. This also results in reduced processing time.

20 Claims, 5 Drawing Sheets

PICKING FUNCTION FOR A PIPELINE GRAPHICS SYSTEM USING HIERARCHICAL GRAPHICS STRUCTURES

BACKGROUND OF THE INVENTION

1. Field of the Invention

This invention relates generally to systems for displaying graphics images on a raster display screen and, more particularly, to graphics display systems which allow the operator to interact to modify or change the displayed images. This invention more particularly relates to methods and apparatus implementing an operator selection or picking process in a pipeline graphics system.

2. Background of the Invention

Graphics display systems for generating and displaying two and three dimensional graphics objects have become increasingly complex. Graphics system operators demand increasingly rapid system response times for increasingly complex graphics objects. Graphics display system technology, in turn, has evolved to meet the combined demands for complex images and rapid response time.

Graphics display system performance has been improved through the use of pipelined graphics processors. In a pipelined graphics system a number of processors divide the work of drawing a graphics image. The pipeline processors are organized so that one of the processors can begin processing the next drawing order before second and subsequent processors have completed the processing of prior orders. In this way, each of the processors is active during each processing cycle though on different parts of the drawing order. The order to create a particular image is passed down the pipeline from the first processor through subsequent processors until the final image is created in video pixel memory. The simultaneous processing of multiple graphics orders greatly increases the overall operating speed of the machine. The number of pipeline stages in a complex graphics system can exceed 100 level.

An example of such a system is shown in FIG. 1. Graphics control processor 100 accesses the system memory 102 to receive graphics orders. Graphics control processor 100 translates the orders into specific graphics commands which are passed to the graphics pipeline processors 104. Several graphics processors may be present in the graphics pipeline to perform functions such as translation, rotation, scaling, mapping, and clipping of the graphics object. In addition, the pipeline processors are responsible for drawing the final image that is placed in the video pixel memory 106 for subsequent display on graphics display monitor 108. A graphics display system also typically contains pick detect logic 110 which is used to detect an object selected by the system operator.

HIERARCHICAL GRAPHICS STRUCTURES

The encoding of complex graphics objects has been simplified through the use of hierarchical graphics description languages. Several evolving, graphics interface standards, such as the Graphical Kernel System (GKS), Programmer's Hierarchical Interactive Graphics System (PHIGS) and Computer Graphics Interface (CGI) provide a link between a graphics application in a program and the graphics system. The use of multilevel or hierarchical databases to hold graphics models has minimized the data replication of graphics models and has facilitated interactive modifications and transformations of this data. Graphics structures or models can be defined once, and then referenced as many times as necessary to create a particular image.

The basic building block of a hierarchical graphics interface is the "structure". Structures contain graphics elements such as drawing primitives (e.g., lines, characters, polygons), attribute selections (color), modeling transformations, labels, and viewing selections. Structures specify the sequence of elements which, when processed, generate a specific effect on the screen. In the hierarchical graphics environment, structures may access other structures which can, in turn, access still other structures. This creates a tree-like hierarchy where primitive structures can be used repeatedly throughout the drawing operation.

Graphic scenes are created by a process of traversing the structure tree through the various levels as defined by the current structure. FIG. 2 illustrates the tree structure of a hierarchical graphics interface. The highest level unit is a view, which defines all objects to appear in a certain area of the display device. Each view contains a number of root structure blocks that contain the sub-structure for one of the objects appearing in the view. Each root structure contains pointers to additional lower level structures that define the object to be displayed.

The process of traversal is that of accessing each view, each root structure, and finally each component structure making up the object. When a structure or model is traversed, an EXECUTE STRUCTURE command will cause another structure or model to be executed within the context of the current structure. This "child" structure inherits the attributes of the "parent" structure during this operation. The child structure continues to execute until it encounters another structure command or until all of its structure elements have been processed. An example of this sequence is shown in FIG. 3.

Each structure may contain structure elements to draw a line, polygon, or other graphics primitive, as well as an "Execute Structure" command Structure A (120) is the root structure of this example and is comprised of several commands 122, 124, 126, 128 and 130. Command 124 causes the execution of structure B (132) which in turn comprises commands 134, 136, and 138. 138 executes structure D (140) with its associated basic commands 142, 144, and 146. Once the processing of structure D (140) has been completed, control returns to structure B which, upon execution of structure D 138 has also been completed. Control now returns to structure A (120) and step 126. Step 128 is a second execute structure command causing structure C (148) to be executed including commands 150, 152, and 154. Command 154 executes structure D producing a second instance of the described structure.

Structure C, prior to executing the structure D may have specified a different position for structure D than specified by the structure B commands. For example, structure D may represent the basic commands necessary to draw the leg of a chair. Structure B may cause the drawing of one leg of a chair while structure C causes the drawing of a similar leg in a different position. Additional structure execution would be required to complete the chair object. Upon completion of the execution of structure D control returns to command 154 in structure C and finally to command 130 in structure A. Upon completion of command 130 processing of structure A is complete and control returns to the graphics control processor to begin execution of the next root structure or next view.

Whenever an execute structure command is processed to execute a child structure, the following system processes must occur:

Traversal of the parent structure is suspended;
The values of the parent structure state are saved;
The child structure is traversed and completed;
The child structure returns to the parent structure;
The parent structure values are restored from the save area;
The parent structure traversal resumes.

The execution of structures and traversal is described in greater detail in U.S. patent application Ser. No. 912,876, filed Sep. 26, 1986 and entitled "Traversal Method for a Graphics Display System".

PICKING

Picking is a mechanism that allows a graphics system operator to select a particular object on the display screen to be edited, deleted, or copied. Picks are typically indicated with a physical locator such as a tablet and stylus or a mouse that manipulates the position of the screen cursor. The operator moves the screen cursor to the displayed object of interest and then pushes a button on the physical device. The graphics application program must then find the "picked" object in the display program. The object may then be highlighted on the screen (echoed) or edited in some manner as defined by the application program.

Determining the "picked" object requires the graphics controller to provide enough information to the application program to locate the object. Hierarchical graphics interfaces use the concept of a pick identifier, pick path, and pick path depth to identify the displayed objects. The pick identifier is a label which can identify a single primitive or group of primitives. The pick path is a list containing the sequence of structures and elements in the structure tree. The pick path depth is the level of structure nesting within the structure tree at the point of the picked primitive.

The application program can construct a hierarchy with multiple instances of a structure, thus one primitive can appear several times in a view. Unique identification of the picked instance of the primitive requires a graphics controller to return a list of pick identifiers, structure names, and element pointer values. This list represents the path taken through the structure network during traversal and permits the application program to precisely identify the "picked" object. The pick path list usually contains the following information:

Structure identifier or name of each structure in the pick path;
Structure element number at each level in the pick path;
Label identifier active for each structure in the pick path; and
Pick identifier active for each structure in the pick path of the specified element in that structure.

SUMMARY OF THE INVENTION

Pipelined graphics systems operate to simultaneously process several graphics orders. A graphic controller 100 in FIG. 1, is responsible for decoding and processing graphics structures in the hierarchical graphics architecture. A control processor typically retains the "state" of the graphics structures at any instant. The state consists of the currently active attributes, e.g., the foreground color, character size, transformation matrices, line, style type, etc., used to render a particular scene. The application program must determine the precise state of a structure when an element in that structure is picked.

Picking is usually done at a different pipeline level from the graphics control processor. Typically, pick processing is performed after an object has been transformed, clipped, mapped, and even rasterized on the screen. This could be several pipeline levels below the graphics control processor that holds the state of the structure. In a pipelined architecture, the graphics control processor is executing ahead of the pick detect hardware (see FIG. 1). Therefore, when a pick is detected, the state in the graphics control processor may have changed and it is necessary to recreate the structure state for the picked object.

The present invention is directed toward apparatus and processes necessary to quickly and efficiently store a pick path and machine state in a pipeline graphics system. The invention is directed toward providing a pick stack for storing pick status information in a readily updatable and accessible form. In addition, the invention is directed toward providing an improved machine state storage mechanism which allows the pre-existing machine state to be restored and executed when a processing element has been selected, for example, to echo the picked primitives.

It is therefore an object of the present invention to provide a novel pick stack structure and an improved method for storing and accessing the pick stack.

It is a further object of the present invention to provide an apparatus for efficiently storing graphics processor machine states for a number of graphics objects as they are processed through the pipeline processor.

It is yet another object of the invention to provide an improved method for determining the machine state associated with a picked object, and making that machine state available to echo the pick.

These and other objects of the invention will be described in the following detailed description.

DETAILED DESCRIPTION OF THE PREFERRED EMBODIMENT

Figure 1:
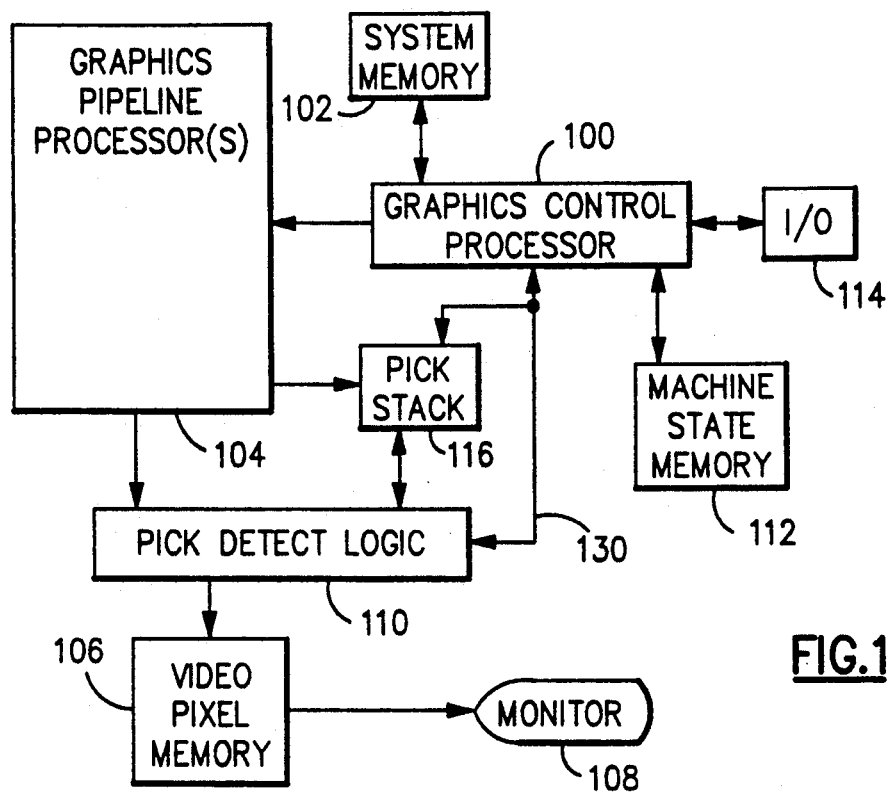
FIG. 1 is a block diagram illustrating a graphics display system according to the present invention.
Figure 2:
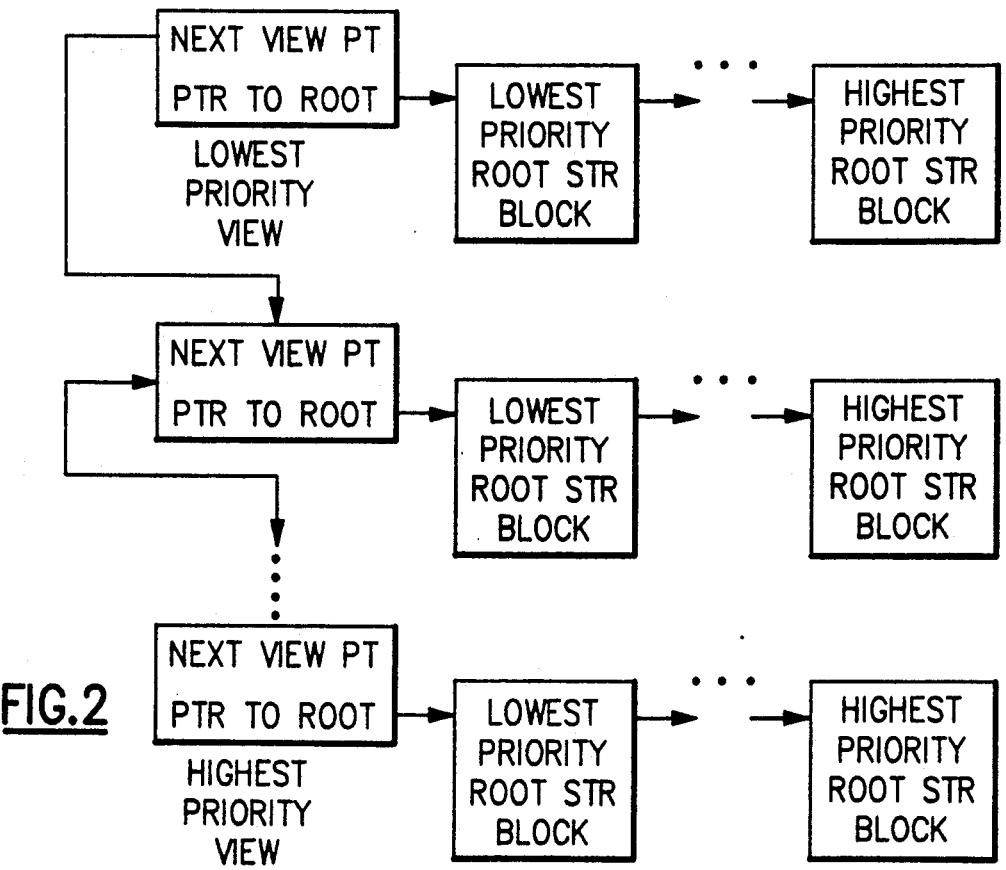
FIG. 2 is an illustration of the relationship between structure elements in a hierarchical graphics system.
Figure 3:
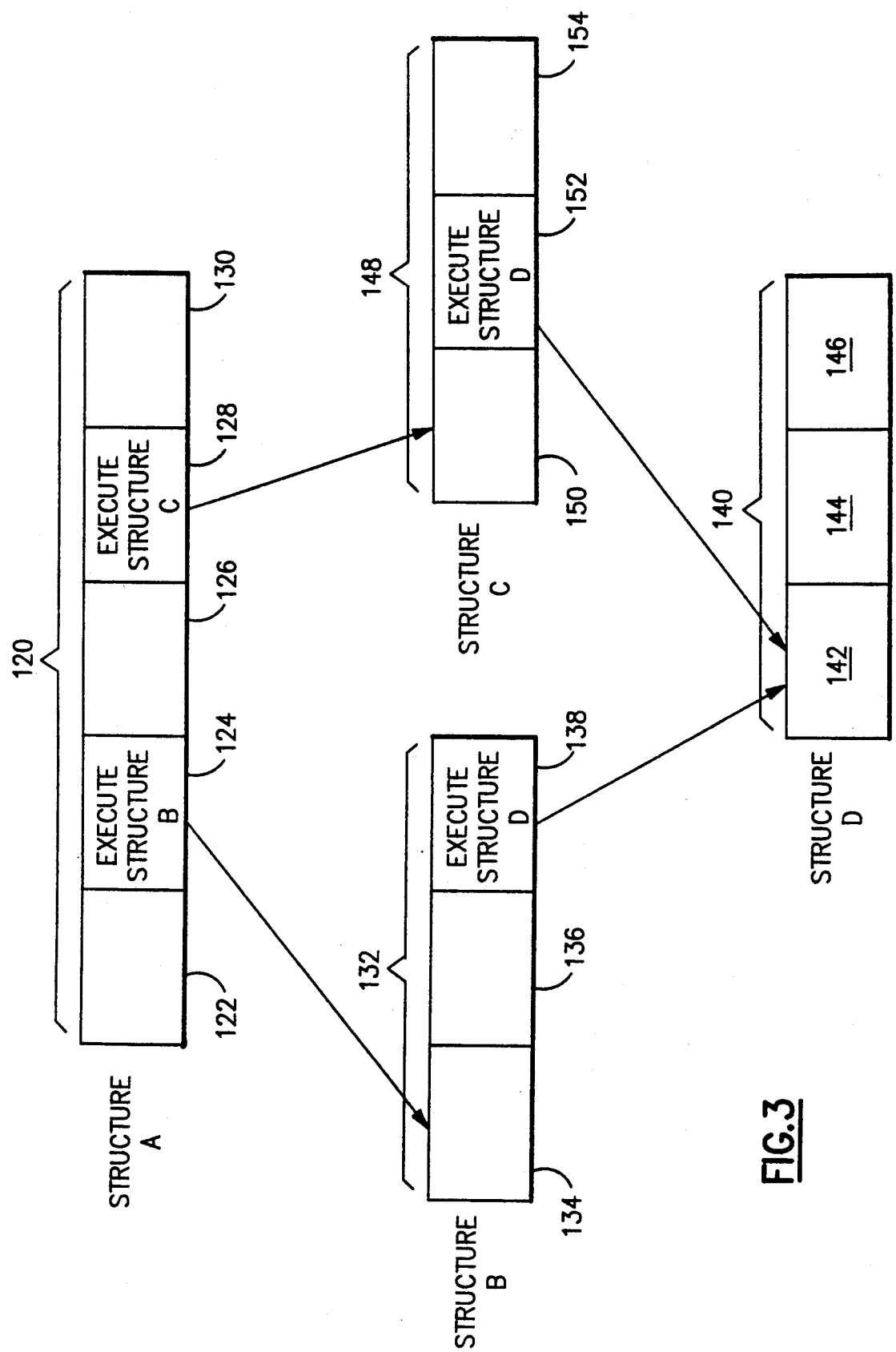
FIG. 3 is an illustration of the relationship between structure executions in a hierarchical graphics system.

A graphics system employing the present invention is shown in FIG. 1. Graphics control processor 100 is responsible for executing a graphics program residing in system memory 102. A graphics control processor is mainly concerned with the generation of an image to display on display device 108. The graphics control processor 100 performs the control functions including decoding graphic structure elements and executing non-drawing structure elements. The decoded orders are passed to the graphics pipeline processors 104. The graphics pipeline processors perform transformation, clipping, and mapping to screen coordinates of the graphics data. For example, in three dimensional interactive graphics used in computer aided design (CAD), each geometric primitive, such as vectors, programmable characters, fixed characters, and polygons, undergo transformation, clipping, and mapping. Transformation includes the processes of rotation, translation, scaling, shearing or some combination, typically performed using matrix multiplication. The transformed object is then clipped by a clipping volume representing the visible area of the object. The clipped object is mapped to the viewport on the screen. Finally, a drawing processor generates the pixels in video pixel memory 106 necessary to represent the final drawn object.

Video pixel memory 106 holds the generated image for display on the monitor. In the preferred embodiment, video pixel memory 106 consists of 24 bit planes each having 1280×1024 pixels and supporting 16 million simultaneous colors through color lookup tables.

As described above, picking is the process of communicating an operator selection to the system. Input/Output (I/O) devices such as a cursor, or stylus and tablet, are connected to the graphics processor through I/O interface 114. I/O interface 114 communicates the relative position of the operator selection device to the graphics pipeline processor 104 and pick detection logic 110. The detection of picking occurs during the drawing processor cycle and not in the graphics control processor.

A system according to the preferred embodiment of the present invention defines a "pick window" bounding the cursor position. The pick window may be, for example, 4 pixels by 4 pixels square. The boundaries of the pick window are transmitted to pick detect logic 110. As the drawing processor draws pixels to the video pixel memory, pick detect logic tests each point to determine whether that point is within the defined pick window. (Other picking mechanisms could be employed, e.g., pick detect before drawing.) If a pick is detected, pick detect logic 110 generates an interrupt via line 130 to signal graphics control processor 100 that a pick has occurred.

Because the graphics control processor has continued to process subsequent graphics orders, it must first determine the machine state corresponding to the picked graphics object. The present invention introduces a novel pick stack 116 and machine state memory 112 to allow the graphics control processor to quickly and efficiently determine the machine state for the picked graphics object.

The pick detect logic and pick stack will first be described. Pick detect logic 110 contains the circuitry necessary to detect the presence of a pick condition, retain valid information, and stop the pipeline processors from further processing until the pick condition is serviced. Pick stack 116 is an inventive logic circuit that holds the information on the pick path in a hierarchical graphics architecture. The preferred embodiment implements the pick stack as a 128×32 bit random access memory (RAM) array which can be randomly accessed by a graphics control processor 100 or accessed like a stack memory by the pipelined processors 104. A stack is typically accessed in a fixed order, such as last in, first out (LIFO). Thus, various elements may be "pushed down" onto the stack and then reaccessed ("popped") in the reverse order.

Two registers are provided in the preferred embodiment to hold the top of stack (TOS) pointer and an offset from the TOS used when the pick stack is operated in stack mode. The stack mode of the pick stack permits the pipelined processors 104 and the graphics controller 100 to store pick path information without having to externally manipulate address pointers. The internal TOS pointer automatically tracks the current top of the stack location. This pointer can be updated by the graphics controller through a memory map or register address. It can also be updated through the graphics pipeline processors 104. Pipeline commands allow the information on the pick stack to remain synchronized with the other vector data and attributes falling through pipeline processors 104.

The random access mode of the pick stack allows the graphics controller to quickly and efficiently retrieve the pick path information when a pick event has occurred. This mode operates like normal random access memory by addressing unique data locations in the memory.

Multiple pieces of information need to be held for each structure level. The pick stack supports a second pipeline command to store data at an offset from the current TOS pointer. Typically, three pieces of information are needed to hold the pick path structure in the pick stack: the structure name, the element pointer, and the pick ID. In the preferred embodiment, a fourth and a fifth element are added containing the machine state queue pointer and label identifier. The machine state queue and element count can be represented in a single stack level, thus, only four levels are required. A pick stack as described herein can be implemented in systems that do not have machine state memory described in the present invention.

The graphics controller 100 sends a command to adjust the TOS pointer in the pick stack by three or four when processing begins for a new structure. Next, control processor 100 will initialize the stack by passing the structure name, pick ID value, and element number to the pick stack. If it is later necessary to modify the pick ID, graphics control processor 100 sends a command to update the value at the particular offset.

When the graphic controller has finished processing a graphics structure, it returns to process the parent structure and inherits the parents attribute state. When this occurs, the graphics control processor 100 sends a command to the pipeline to adjust the pick stack by decrementing the TOS pointer and in effect removing the prior pick information from the stack.

A pick event causes the pick detect logic to halt the pipeline 104 and signal the graphic control processor 100. The graphic control processor reads the current pick stack TOS value to determine the depth of hierarchical structure nesting. It then begins reading the contents of the pick stack through the random access port. The TOS value serves as an indirect pointer to the memory address which contains the highest level of the pick path. Pick path information is then used to determine how to further process the pick event by the application program.

Hierarchical graphics applications support a deep level of structure nesting, and consequently, the pick stack may be unable to contain the entire pick path due to its finite memory size. The preferred embodiment of the present invention includes an overflow capability to handle this contingency. If a graphics control processor command attempts to address an area beyond the physical memory range of the pick stack, internal detect logic will flag the condition and generate an interrupt to the graphics control processor. Upon receiving the interrupt, the graphic controller can randomly access the pick stack and save a portion of its contents into another memory location, (e.g., scratch RAM). When the saving is complete, the graphics control processor clears the interrupt, and the pick stack finishes its previously halted operation. Thus the pick stack can support an arbitrary level of structure nesting through the overflow and pick stack save procedure.

The depth of the pick path decreases as called structures return to their parent structures. In cases where the pick path exceeded the memory capacity of the pick stack and its contents were saved in scratch memory, an underflow detect capability is provided to determine when the graphic controller can return the saved information to the pick stack.

Figure 4:
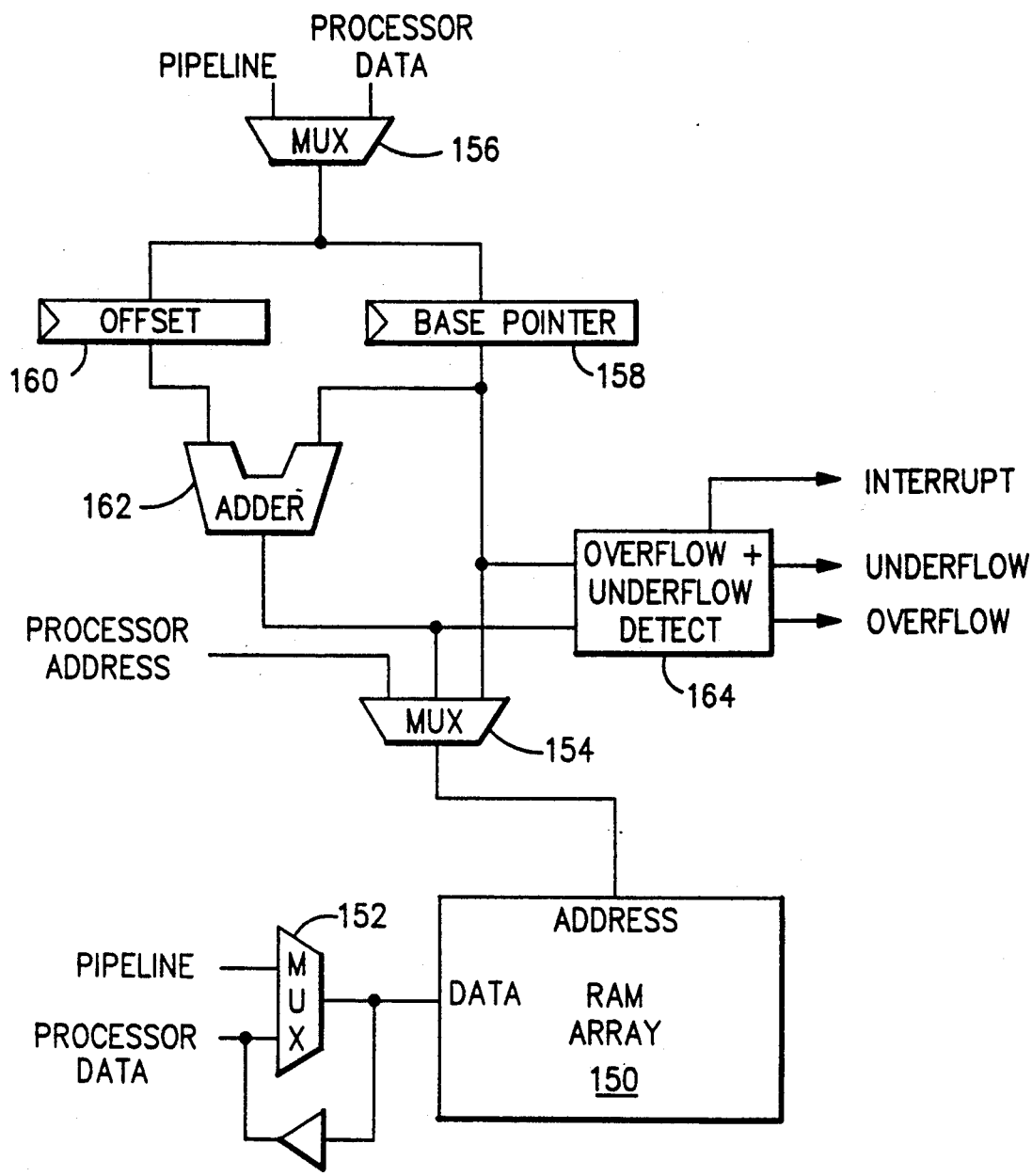
FIG. 4 is a block diagram of a pick stack and associated logic according to the present invention.

A detailed block diagram of the pick stack 116 and its associated logic is shown in FIG. 4. The pick stack is maintained in random access memory (RAM) array 150. Data to be entered into the pick stack is supplied through multiplexer 152 from the pipeline processors 104 or from the graphics control processor 100. Data read out of the pick stack flows to the processors via the data lines. The ability to address the memory as a stack or randomly is provided by the address circuits contained above RAM array 150. Multiplexer 154 controls the address supplied to access the RAM array. Pipeline and processor data requests enter the pick stack through multiplexer 156. Processor commands can update the base stack pointer 158 which contains the top of stack (TOS) pointer value. The processor data commands may also adjust the offset 160. A memory address is calculated in adder 162 by adding the offset 160 to the base pointer 158. The calculated address as well as the base pointer are passed to overflow and underflow detect circuit 164 which compares them to the available memory size and generates the necessary interrupt and underflow or overflow indicator signals. When the graphics control processor 100 is accessing the RAM array randomly, the processor address is supplied directly to multiplexer 154 for addressing the requested RAM array cell.

The pick stack contains two mutually exclusive access ports: a random access port and a stack port. The random access port allows a graphics controller 100 to initialize and test the pick stack RAM during diagnostics. It further permits graphics controller 100 to quickly process the pick path data independent of the graphics pipeline. The stack port is connected to the graphics pipeline and allows the RAM array to be accessed as stack memory, thus pick path information can be conveniently stored through the stack mechanism. Changing the top of stack pointer allows structure levels to be added or removed in an efficient manner. The stack mode also minimizes the amount of data that must be sent down the pipeline because the address is relative to the TOS pointer.

Base pointer 158 is an address register which points to the current top of stack in the pick stack memory array. Memory accesses made through the graphics pipeline are relative to this base pointer. The base register can be modified through the pipeline using a command or through a memory mapped register address. The command modifies the base pointer by a positive or negative offset from its current value. It is used to change the pick depth when a new structure is initiated. A memory mapped address allows an external processor to clear, test, or change the base pointer value without any pipeline delay. The pick stack offset and load is an operation performed on the pick stack that stores pipeline data in the pick stack and a specified offset from the base pointer register. The offset value is always a positive number. A single piece of data is stored for every pick stack offset and load operation.

In the preferred embodiment, the pick stack logic described in FIG. 4 is implemented in gate array technology. It will be clear to others in the field that alternate embodiments are possible using conventional logic or implementing the scheme entirely in software.

Figure 5:
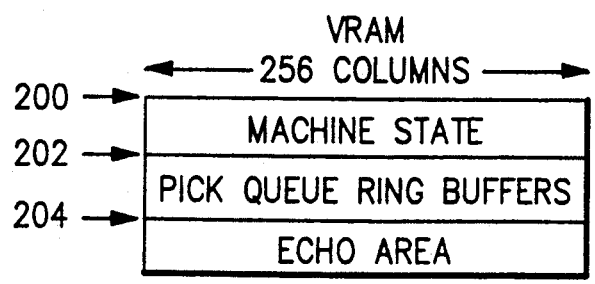
FIG. 5 is an illustration of the machine state memory according to the present invention.

Machine state memory 112 is shown in greater detail in FIG. 5. Machine state memory 112 is implemented in the preferred embodiment as video RAM partitioned into several major areas. Video RAM was selected to provide an ability to rapidly access and to rapidly move the values contained in the rows. In the preferred embodiment a video RAM (VRAM) having 256 rows each containing 256 long words or 1 K bytes was employed, however, other structures could be used. The first 72 rows of the VRAM memory are used to store the state of the machine when an "execute structure" command is issued by graphics control processor 100. Two rows of VRAM are used to store the full state of the machine including transformation matrices and attributes. This area begins at point 200 and is accessed by a current row pointer labelled VRMPTR. The next area of VRAM starting at point 202 contains the state of the machine associated with output primitives being sent through the pipeline processors 104. Sixty-four rows of VRAM are provided to ensure that there is at least one row per stage in the pipeline. The pointer to the next available row is labelled PCKQUEUE and is expressed as an offset from initial pointer 202.

The next segment, containing 32 rows, contains copies of the machine states of primitives being picked, and is used for echoing purposes The echo area requires only one row per structure. A single row contains the information required to echo the pick. The picked object's machine state area starts at pointer 204 and is addressed by a pointer PCKECHO. The pointer is relative to location 204.

The machine state memory is used in conjunction with the pick stack 116 to be able to rapidly determine the state of the machine for a picked object and to rapidly echo the picked object to indicate its selection to the operator.

As discussed above, graphics control processor 100 sends information to the pick stack whenever an "execute structure" command is processed. When a new structure begins, graphics control processor 100 sends the current structure element number, a command to increment the pick stack pointer by four, the structure identifier, the pick identifier, and the label identifier to the pick stack. These values are stored as described above. At the end of an execute structure, graphics control processor 100 will send a command to decrement the pick stack pointer. Whenever a set pick identifier element is executed, the graphics control processor sends a command to load the new pick identifier into the pick stack. When a "set label identifier" structure element is executed, graphics control processor 100 sends down the command to load the new label identifier.

A pick tag is associated with every pickable primitive command sent down the graphics processor pipeline. The lower sixteen bits of the pick tag are the structure element numbers associated with the output primitive, and the most significant eight bits are the pick queue ring buffer pointer PKQUEPTR for accessing pickable output primitive machine state area of the VRAM contained following pointer 202 in FIG. 5.

Whenever the graphics control processor 100 processes an output primitive it writes the op code and system memory address of the structure element to the current machine state registers in the first area of the machine state memory. The processor then copies the first row of the current machine state to the row offset by PKQUEPTR from pointer 202. The offset value is inserted into the pick tag which is transmitted to pick stack for updating. The row transfer is rapid due to the use of video RAM.

Pick processing accesses the data in the pick stack and in the machine state memory in order to derive the required machine state and object identifier. When the pick detect module detects an output primitive intersecting the pick window, it generates an interrupt to the graphics control processor. The graphics control processor can be initialized to handle three different pick modes: pick the last object drawn that intersects the pick window; to pick the first object drawn that intersects the pick window; and to pick all the objects that intersect the pick window.

Figure 6:
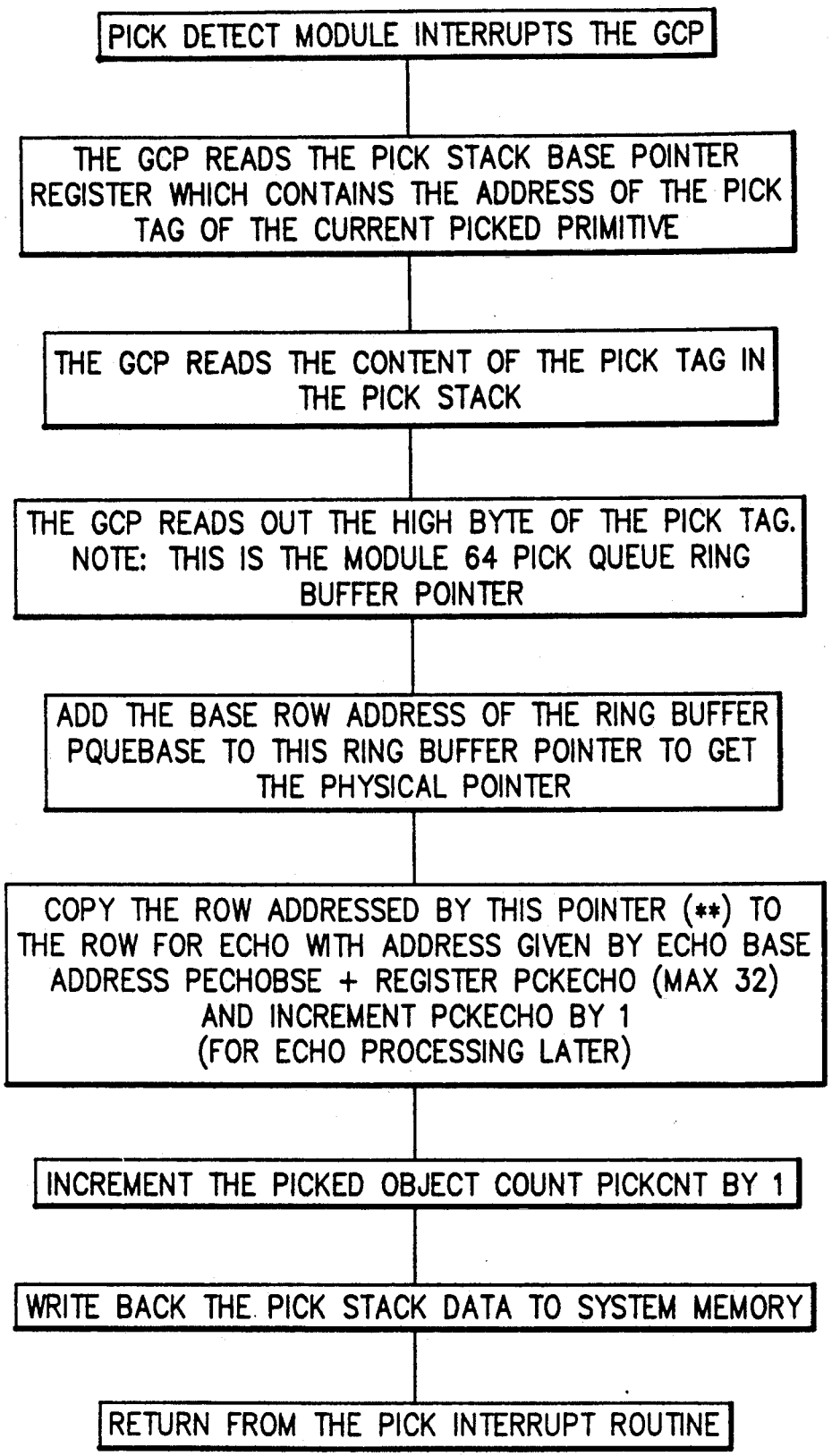
FIG. 6 is a flow chart describing the actions taken upon a pick detection.

When a pick occurs, the pick detect module first interrupts graphic control processor 100. The processor determines the source of the interrupt and reads back the pick stack base pointer register. The graphics control processor 100 is then able to read back the contents of the pick stack pointed to by the current pointer. This contains the pick tag including the pickable output primitive offset in state memory 202. The address of the picked primitive is calculated by adding the offset to base value 202 and the row is copied into the picked object machine state area beginning at point 204. The use of video RAM allows row copying to occur rapidly. The level of the pick path is determined by subtracting the pick stack base pointer from the current pointer. The pick path data block is written to system memory and the picked object counter is incremented by one. The pick processing interrupt routine is terminated and control returned to the control processor 100 (see FIG. 6).

Figure 7:
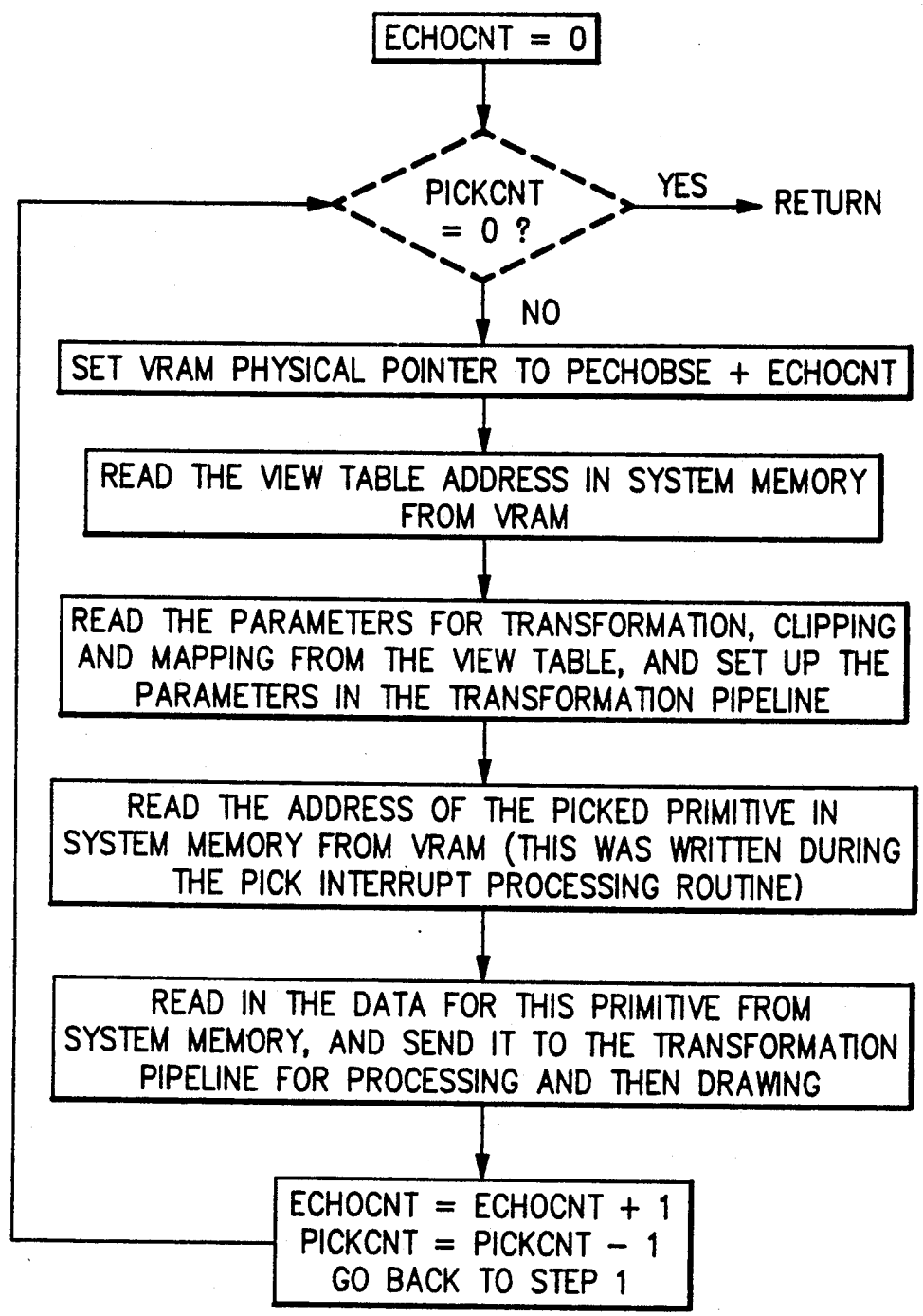
FIG. 7 is a flow chart showing the steps required to echo the selection of a picked object.

After a pick traversal is completed, if the number of picked objects is not zero, the graphic control processor 100 uses the data in the VRAM area at 204 to restore the machine state of the picked primitives and the address of the structure element in system memory to fetch the output primitive data for drawing the echo object. This greatly speeds up object echoing because only picked objects need to be redrawn rather than the entire display being redrawn (see FIG. 7).

Thus, the machine state memory 112 can be used to speed up the pick processing by rapidly determining the required machine state and by storing the states for objects to be echoed in a manner which allows them to be quickly redrawn. As discussed above, the video RAM, as implemented in the preferred embodiment, provides a means for rapidly transferring rows between the three state storage areas.

The present invention has been described in terms of particular components having specific sizes and capacities. However, it will be recognized that many alternatives exist for embodying this function relying on different types of devices with different capacities. Many of the processes described as employing hardware can be implemented in software and vice versa.

We claim:

1. In a graphics system in which graphics orders representing graphics primitives are organized as a hierarchy of structures at multiple levels with structures at higher levels invoking structures at lower levels, said orders being executed by a graphics pipeline having an input end and an output end, such that the structures currently being executed at said output end may differ from the structures currently being executed at said input end, said output end having a defined pick path made up of the structures currently being executed at said output end, apparatus for generating pick path data comprising:

means for detecting the interception of a predetermined pick window by a picked primitive being processed at said output end of said pipeline;

means for maintaining a stack storing pick path information indicating the pick path at said output end of said pipeline; and means for modifying said pick path information in said stack in response to the processing of said primitives at said output end of said pipeline, thereby to allow said system to return said pick path information at the time of detection of said picked primitive.

2. Apparatus as in claim 1 further comprising a control processor at said input end of said pipeline for decoding said graphics orders and for issuing commands to said pipeline in execution of said orders.

3. Apparatus as in claim 1 in which an entry identifying an invoked structure is added to said stack when the execution at said output end of said pipeline proceeds to said invoked structure and is removed form said stack when said execution returns from said invoked structure.

4. Apparatus as in claim 3 in which said entries are added to and removed from said stack in response to commands issued to the input end of said pipeline and executed at the output end of said pipeline.

5. Apparatus as in claim 3 further comprising:

means for reading said stack entries in response to the detection of said picked primitive to determine the current pick path at said output end of said pipeline.

6. Apparatus as in claim 1 further comprising:

means for defining a machine state area for storing the machine state for each level of structure currently being executed at said input end of said pipeline; and means for adding an entry indicating the current machine state to said machine state area when the execution at said input end of said pipeline invokes a structure.

7. Apparatus as in claim 6 further comprising:

means for defining a second machine state area for storing the machine state associated with each pickable primitive; and means for transferring machine state data from the first machine state area to a location in said second machine state area when a pickable primitive is encountered at the input end of said pipeline.

8. Apparatus as in claim 7 in which a pointer to said location in said second machine state area is provided to the input end of said pipeline and is stored in said stack upon reaching the output end of said pipeline.

9. Apparatus as in claim 7 further comprising:

means for defining a third machine state area for storing the machine state associated with each picked primitive; and means for transferring machine state data from the second machine state area to a location in said third machine state area in response to the detection of a picked primitive at the output end of said pipeline.

10. Apparatus as in claim 9 in which a pointer to a location in said second machine state area is provided to the input end of said pipeline and is stored in said stack upon reaching the output end of said pipeline, said machine state data being transferred to said third machine state area from the location in said second machine state area indicated by said pointer.

11. In a graphics system in which graphics orders representing graphics primitives are organized as a hierarchy of structures at multiple levels with structures at higher levels invoking structures at lower levels, said orders being executed by a graphics pipeline having an input end and an output end, such that the structures currently being executed at said output end may differ from the structures currently being executed at said input end, said output end having a defined pick path made up of the structures currently being executed at said output end, a method of generating pick path data comprising the steps of:

detecting the interception of a predetermined pick window by a picked primitive being processed at said output end of said pipeline;

maintaining a stack storing pick path information indicating the pick path at said output end of said pipeline; and modifying said pick path information in said stack in response to the processing of said primitives at said output end of said pipeline, thereby to allow said system to return said pick path information at the time of detection of said picked primitive.

12. A method as in claim 11 in which an entry identifying an invoked structure is added to said stack when the execution at said output end of said pipeline proceeds to said invoked structure and is removed from said stack when said execution returns from said invoked structure.

13. A method as in claim 12 in which said entries are added to and removed from said stack in response to commands issued to the input end of said pipeline and executed at the output end of said pipeline.

14. A method as in claim 12 in which said entries are modified in response to commands issued to the input end of said pipeline and executed to the output end of said pipeline.

15. A method as in claim 12 comprising the further step of:

reading said stack entries in response to the detection of said picked primitive to determine the current pick path at said output end of said pipeline.

16. A method as in claim 11 further comprising the steps of:

adding an entry indicating the current machine state to a machine state area when the execution at said input end of said pipeline invokes a structure.

17. A method as in claim 16 comprising the further steps of:

defining a second machine state area for storing the machine state associated with each pickable primitive; and transferring machine state data from the first machine state area to a location in said second machine state area when a pickable primitive is encountered at the input end of said pipeline.

18. A method as in claim 17 in which a pointer to said location in said second machine state area is provided to the input end of said pipeline and is stored in said stack upon reaching the output end of said pipeline.

19. A method as in claim 17 comprising the further steps of:

defining a third machine state area for storing the machine state associated with each picked primitive; and transferring machine state data from the second machine state area to a location in said third machine state area when a picked primitive is detected at the output end of said pipeline.

20. A method as in claim 19 in which a pointer to a location in said second machine state area is provided to the input end of said pipeline and is stored in said stack upon reaching the output end of said pipeline, said machine state data being transferred to said third machine state area from the location in said second machine state area indicated by said pointer.

* * * * *